Jan. 3, 1967 A. W. LOHMANN 3,296,368
NON-LINEAR OPTICAL SYSTEM
Filed March 16, 1964 2 Sheets-Sheet 1

INVENTOR.
ADOLF W. LOHMANN
BY Elmer Galbraith
ATTORNEY

NON-LINEAR OPTICAL SYSTEM
Filed March 16, 1964 2 Sheets-Sheet 2
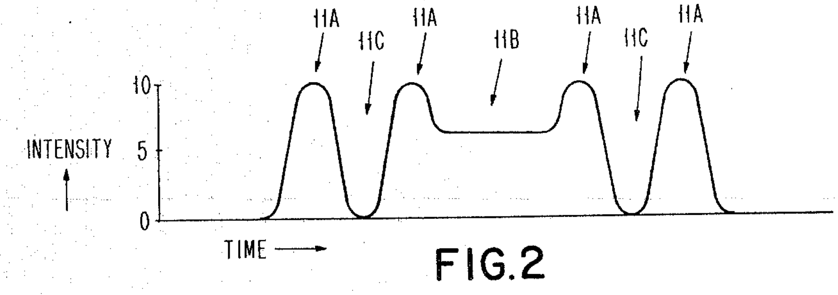
FIG. 2
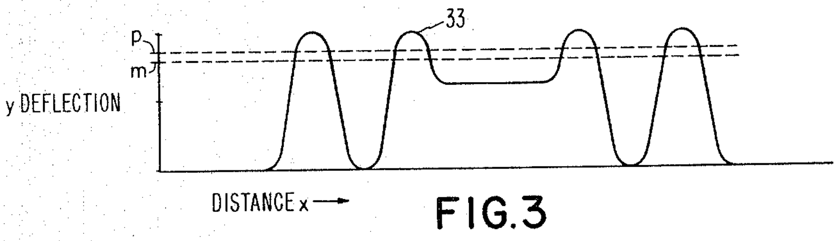
FIG. 3
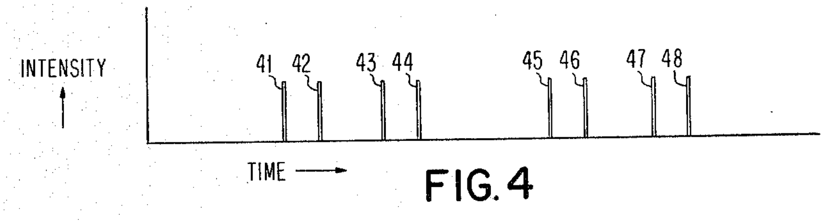
FIG. 4
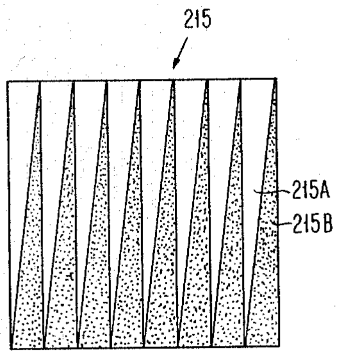
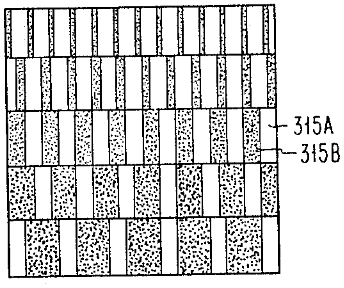
FIG. 5 FIG. 6

United States Patent Office 3,296,368
Patented Jan. 3, 1967

3,296,368
NON-LINEAR OPTICAL SYSTEM
Adolf W. Lohmann, San Jose, Calif., assignor to International Business Machines Corporation, New York, N.Y., a corporation of New York
Filed Mar. 16, 1964, Ser. No. 352,056
4 Claims. (Cl. 178—6.8)

This invention relates to optical systems and, more particularly, to non-linear optical systems.

Linear electronic circuitry has many uses; however, non-linear circuitry provides the electrical engineer with a tool which has many more applications than does linear circuitry. For example, non-linear circuitry makes it possible to transmit information by techniques such as pulse duration modulation, pulse phase modulation, pulse amplitude modulation, etc.

Non-linear operations such as the generation of saw-tooth waves, clamping, clipping, etc. are relatively easy to accomplish with well known electronic circuitry. However, in optical systems it is very difficult to perform most non-linear operations. The present invention is directed to a system for performing any arbitrary non-linear operation upon an optical signal.

An object of the persent invention is to provide a system for performing non-linear operations on optical signals.

Yet another object of the present invention is to provide a system for performing any arbitrary non-linear operation on an optical signal.

Another object of the present invention is to provide an optical system for clipping and/or clamping.

Another object of the persent invention is to provide an optical system for pulse code communication.

Another object of the present invention is to provide a system which can generate an arbitrary non-linear optical signal.

The present invention includes means for changing an optical intensity signal into a spatially variant signal, a mask for selectively masking spatial areas, means for generating an electrical signal which repersents the product of said spatially variant signal and of said mask, and means for transforming said product signal into an optical signal.

The foregoing and other objects, features and advantages of the invention will be apparent from the following more particular decription of preferd embodiments of the invention, as illustrated in the accompanying drawings.

FIGURE 2 shows an example of the output of the signal generator.

FIGURE 3 shows an example of the output of the modulator.

FIGURE 4 shows an example of the output of the receiver.

FIGURE 5 shows a mask which enables the system shown in FIGURE 1 to transmit information by pulse duration modulation.

FIGURE 6 shows a mask which enables the system shown in FIGURE 1 to transmit information by pulse code modulation.

Figure 1:
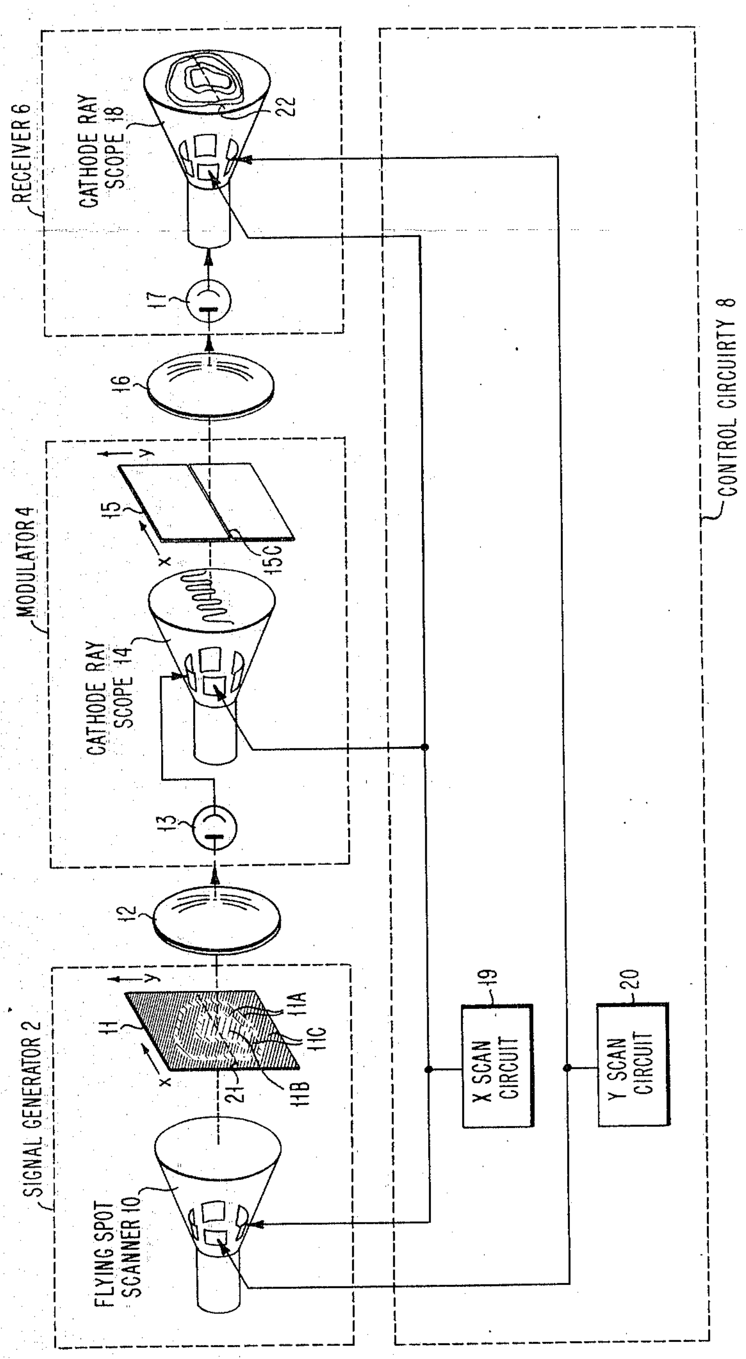
FIGURE 1 shows in diagrammatic form an overall view of a preferred embodiment of the present invention.

The first embodiment of the present invention shown in FIGURE 1 illustrates how the present invention can be used for equidensitometry. Equidensitometry means detecting those areas or lines in an object which have a particular amount of transparency. For ease of explanation, herein the transparency of a particular area in an object is described by a number which ranges from zero to ten. As the magnitude of the number increases the transparency of the area increases. Thus, the number ten indicates a totally transparent area and the number zero indicates a totally opaque area.

The embodiment shown in FIGURE 1 includes in object 11 which has areas of various transparency. The areas designated 11A are totally transparent, that is they have a transparency of ten; the area designated 11B is semi-transparent, that is it has a transparency of five; and the area designated 11C is total opaque, that is it has a transparency of zero. There are no discrete borders between the various areas in object 11, instead the various areas merely blend together. Thus, between an area which is totally opaque and an area which is totally transparent there is some point which has each particular value of transparency between zero and ten. The lines shown in the drawing on object 11 are merely for the purposes of illustration to indicate the various areas.

The system shown in FIGURE 1 is set to detect those areas or lines in object 11 which have a transparency of seven. Since areas 11A have a transparency of ten and area 11B has a transparency of five and since the transparency changes gradually between areas 11A and 11B, somewhere between areas 11A and 11B there is a line having a transparency of seven. The system indicates the location of this line. Likewise, the system indicates the line between areas 11A and 11C where the transparency has a value of seven.

As shown in FIGURE 1, the system includes a signal generator 2, a modulator 4, a receiver 6, and control circuitry 8. Light is transmitted from signal generator 2 to modulator 4 and from modulator 4 to receiver 6.

Signal generator 2 includes a flying spot scanner 10 which illuminates object 11. Modulator 4 includes a photoreceptor 13, a cathode ray scope 14, and a mask 15. Receiver 6 includes a photoreceptor 17 and a cathode ray scope 18. Control circuitry 8 includes an X scan circuit 19 and a Y scan circuit 20. Light is transmitted from signal geerator 2 to modulator 4 through an optical system which is illustrated herein by a lense 12. Light is transmitted from modulator 4 to receiver 6 by an optical system which is herein illustrated by a lens 16.

The object 11 is divided into one thousand horizontal strips or lines (not shown on the drawing) similar to the way that the face of a television tube is divided into a large number of strips. The light spot generated by flying spot scanner 10 traverses the various lines sequentially. That is, the spot first goes from the left to the right of line 1, next from the left to the right of line 2, then from the left to the right of line 3, etc. The deflection of the light beam is controlled by conventional scanning circuitry herein indicated as X scan circuit 19 and Y scan circuit 20. The intensity of the spot of light generated by flying spot scanner 10 is constant. For ease in reference, one particular strip across object 11 is indicated by the dotted line 21.

The horizontal deflection of the electron beam in cathode ray scope 14 and the horizontal deflection of the electron beam in cathode ray scope 18 are controlled by the same circuitry that controls the horizontal deflection of the electron beam in flying spot scanner 10. Thus, with respect to horizontal deflection the electron beam in flying spot scanner 10, in cathode ray scope 14 and cathode ray scope 18 move in synchronism under control of circuit 19 and the horizontal deflection of each of these beams in time variant. The vertical deflection of the electron beam in cathode ray scope 14 is controlled by the magnitude of the output of photodetector 13. The intensity of the electron beam in cathode ray scope 14 is constant. The vertical deflection of the electron beam in cathode ray scope 18 is controlled by Y scan circuit 20. Thus, both the horizontal and the vertical deflection of the electron beam in cathode ray scope 18 are synchronized with the horizontal and vertical deflection of the electron beam in flying spot scanner 10. The intensity of the electron beam generated by cathode ray scope 18 is controlled by the output of photodetector 17.

FIGURE 2 shows the intensity of the light which arrives at photoreceptor 13 as the light beam generated by flying spot scanner 10 scans across line 21. The intensity of the beam is the greatest as the light beam crosses the totally transparent areas 11A. The intensity is zero as the beam crosses totally opaque area 11C and the beam has a moderate amount of intensity as it crosses area 11B.

FIGURE 3 shows the Y deflection of the beam in cathode ray scope 14 during the time that the flying spot scanner scans across line 21. As explained previously, the X deflection of the beam in scope 14 is synchronized in time with the X deflection of the beam in flying spot scanner 10. Since the Y deflection of the spot on scope 14 is controlled by the output of photoreceptor 13, the deflection of the beam corresponds to the variation of intensity shown in FIGURE 2. The Y deflection of the beam in cathode ray scope 14 is shown in FIGURE 3 by line 33.

Mask 15 has a narrow slot therein designated 15C. The X and Y deflections which correspond to the sides of slot 15C are designated in FIGURE 3 by two dotted lines designated *p* and *m*. Any Y deflection between lines *p* and *m* correspond to a transparency of between 6.5 and 7.5 (hereinafter called a transparency of 7) in object 11. The only light which passes through mask 15 is that light in areas of cathode ray scope 14 which has a Y deflection between the lines *p* and *m*. FIGURE 4 shows the intensity of the light which passes through mask 15 as a function of time. The times that light does pass through mask 15 correspond to the positions in FIGURE 14 where the line 33 crosses between lines *p* and *m*.

The horizontal and the vertical deflection of the electron beams in cathode ray scope 18 is synchronized with the horizontal and the vertical deflection of the beam in flying spot scanner 10. Hence, as the beam of light travels across line 21 in object 11 the beam of cathode ray scope 18 travels across a corresponding line designated 22. The only times there is light on the face of cathode ray scope 18 as the beam travels across line 22 are the eight times designated 41 to 48 in FIGURE 4. Since the electron beams scan across line 22, the horizontal axis in FIGURE 4 also represents distance along line 22. Those positions on the face of cathode ray scope 18 which are illuminated correspond to the positions in object 11 which have a transparency of seven. Thus, lines which appear on the face of cathode ray scope 18 indicate those lines in object 11 which have transparencies of seven. The phosphor on the face of cathode ray scope 18 should have a relatively long persistence so that any illumination lasts through an entire scan of object 11.

The operation of the system could be described as equivalent to electrical clamping and clipping. As a signal is transmitted from signal generator 2 to receiver 6 all signals below a certain level are eliminated and all signals above a certain level are likewise eliminated.

Various other non-linear operations can likewise be performed by the system. The mask in front of cathode ray scope 14 need not merely consist of transparent and opaque areas as shown in the embodiments previously described, but it also may contain areas which have various degrees of transparency between the totally transparent area and between total transparency and total opaqueness.

The present invention can be utilized to transmit information optically by various types of non-linear modulation techniques such as pulse duration modulation, pulse frequency modulation, pulse amplitude modulation, etc. In each case, the pulses referred to are pulses or bursts of light.

The only change required in the system shown in FIGURE 1 in order to adapt the system to transmit information by pulse duration modulation is that mask 15 must be replaced by mask 215 shown in FIGURE 5. Mask 215 has a plurality of triangularly-shaped opaque areas 215B and a plurality of triangularly-shaped transparent areas 215A. With mask 215 in the system the information transmitted between modulator 4 and receiver 6 is codded by pulse duration. That is, information is transmitted from modulator 4 to receiver 6 through optical system 16 by optical signals which carry information by means of pulses or bursts of light. The information content of the signal is indicated by the length of the various pulses or bursts of light.

As previously explained, variations in the transmissivity of object 11 result in variations in the *y* deflection on the face of cathode ray scope 14. Considering one particular horizontal strip of mask 215 the length of the opaque portions and the length of the transparent portions in the particular strip depends upon the height or the *y* deflection of the strip. Hence, as the beam in cathode ray scope 14 scans across mask 215, the length of the burst of light which passes through mask 215 depends upon the *y* deflection of the beam. Since the *y* deflection of the beam in cathode ray scope 14 is a function of the transparency of object 11, the length of the burst of light passing through mask 215 is a function of the transmissivity of object 11.

For convenience of illustration, mask 215 is shown with a relatively small number of relatively large triangularly-shaped areas. The amount of detail which can be transmitted by a system is a direct function of the size of the areas in the mask. Greater detail can be transmitted from object 11 to the face of receiver 6 by using a mask having a larger number of smaller triangular areas. Stated differently, high spatial frequencies can be transmitted with a mask which has a higher spatial frequency. The optical system connecting modulator 4 to receiver 6 is merely shown diagrammatically by means of lens 16. It should be understood however, that receiver 6 could be located remote from modulator 4 and that light could be transmitted from modulator 4 to receiver 6 by any conventional type of system such as by means of mirrors or light pipes.

The system shown in FIGURE 1 can also be used to transmit information by means of pulse frequency modulation. That is, it can be used to transmit information by means of light pulses, the number of pulses being indicative of the information content of the light.

In order to transmit information by pulse frequency modulation, mask 15 must be replaced by mask 315 shown in FIGURE 6. Mask 315 is divided into a plurality of horizontal strips. Each strip has a plurality of transparent areas 315A and a plurality of opaque areas 315B. The width of the transparent areas in each strip is constant; however, each strip has a different and unique frequency. There are more transparent areas in the higher strips than there are in the lower strips.

As the *y* deflection of the beam of cathode ray scope 14 changes, the beam traverses strips in mask 315 which have different frequencies of transparent and opaque areas. Since the *y* deflection of the beam in cathode ray scope 14 is a function of the transparency of object 11, and since the frequency of light passing through mask 315 is a function of the *y* deflection of the beam in cathode ray scope 14, the frequency of the light generated by modulator 4 is a function of the transparency of object 11. Thus, the information is transmitted from modulator 4 to receiver 6 by pulse frequency modulation. The frequency referred to is the frequency of the pulses or bursts of light, and it does not refer to the actual frequency (color) of the light.

When transmitting information by pulse modulation, the decoding is accomplished by cathode ray scope 18. If cathode ray scope 18 has a high revolution, an array of dots and dashes appear on the face of cathode ray scope 18. The average of these dots and dashes indicates the transmitted information. The required spatial averaging is accomplished by slightly defocusing the image in cathode ray scope 18 or by providing a phosphor on the face of the tube which has a very low revolution.

Various other masks can be devised to transmit information by various other modulation schemes. The two embodiments described above are merely exemplary and those skilled in the art will recognize that other masks can be used to transmit information by other similar modulation techniques.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A device for generating a function of an optical signal, comprising:
   means for generating an optical signal, said signal having two controlled variables, said controlled variables being intensity and time;
   means for displaying said signal as a spatially variant optical signal with $x$ and $y$ coordinates wherein said variations in intensity are displayed as variations in the $y$ coordinate and said variations in time are displayed as variations in the $x$ coordinate;
   a mask having a transparency which varies spatially according to said function, said mask being positioned in front of said display;
   means for collecting the light which passes through said mask;
   a cathode ray scope for generating an image, said cathode ray scope having a beam;
   means for modulating the intensity of the beam in said cathode ray scope in accordance with the intensity of the light passing through said mask; and
   means for modulating the spatial position of the beam in said cathode ray scope in synchronism with the time variable of said first signal;
   whereby the image generated by said cathode ray scope represents said function of said optical signal.

2. A device for generating optical signals, comprising:
   means for generating first light signals wherein information is indicated by variations in intensity and time, said variations in time being indicative of variations in position;
   means for changing said first light signals into an optical display wherein said variations in intensity are displayed as variations in a $y$ coordinate and said variations in time are displayed as variations in an $x$ coordinate;
   a mask having spatially variant transmissivity, said mask being positioned in front of said display, whereby a second light signal is generated wherein information is indicated by variations in intensity and time; and
   means for changing said second light signal into a second optical display wherein variations in time are indicated as variations in displacement; and variations in intensity are again indicated as variations in intensity,
   whereby said second display represents a function of said first light signal, the particular function being dependent on the spatial variance of said mask.

3. A device for generating a function of the transparency of an object;
   means for scanning said object with a beam of light, said scanning means having an $x$ deflection control and a $y$ deflection control;
   a first cathode ray display device having an $x$ deflection control and a $y$ deflection control;
   a second cathode ray display device having an $x$ deflection control and a $y$ deflection control and an intensity control;
   means for synchronizing the $x$ deflection of said scanning means, said first cathode ray scope and said second cathode ray scope;
   means for controlling the $y$ deflection of said first cathode ray scope by the intensity of the light which passes through said object;
   a mask having a spatially variant transparency in front of said first cathode ray scope;
   means for synchronizing the $y$ deflection of said second cathode ray scope with the $y$ deflection of said scanning means; and
   means for regulating the intensity of said second scope by the intensity of the signal passing through said mask,
   whereby an image is generated on the face of said second scope which represents a function of said object, the particular function being dependent upon the spatial variance of said mask.

4. A device for generating a particular function of the transparency of an object, comprising:
   a flying spot scanner for scanning said object;
   a first cathode ray scope, the $x$ deflection of said scope being synchronized with the $x$ deflection of said flying spot scanner and the $y$ deflection of said first scope being controlled by the intensity of the light passing through said object;
   a mask positioned in front of said first cathode ray scope, said particular function being represented in said mask by spatial variations in transparency;
   a second cathode ray scope, said second cathode ray scope having means for controlling $x$ and $y$ deflection and means for controlling intensity and means for synchronizing the $x$ and $y$ deflection of second cathode ray scope to the $x$ and $y$ deflections of said flying spot scanner; and
   means for regulating the intensity of second scope by the intensity of light passing through said mask,
   whereby said particular function of said object appears on the face of said second scope.

References Cited by the Examiner

UNITED STATES PATENTS

| | | | |
|---|---|---|---|
| 2,097,141 | 10/1937 | Blaney | 179—100.31 |
| 2,922,049 | 1/1960 | Sunstein | 250—217 |
| 2,999,127 | 9/1961 | Fisher | 178—7.5 |
| 3,006,238 | 10/1961 | Eberline | 88—14 |
| 3,214,515 | 10/1965 | Eberline | 178—6.8 |

DAVID G. REDINBAUGH, *Primary Examiner.*

J. A. ORSINO, *Assistant Examiner.*